United States Patent
Hecht (10) Patent No.: US 8,613,580 B2
(45) Date of Patent: Dec. 24, 2013

(54) FASTENING DEVICE

(75) Inventor: Daniel H. Hecht, Fort Worth, TX (US)

(73) Assignee: Lockheed Martin Corporation, Bethesda, MD (US)

(*) Notice: Subject to any disclaimer, the term of this patent is extended or adjusted under 35 U.S.C. 154(b) by 275 days.

(21) Appl. No.: 13/096,504

(22) Filed: Apr. 28, 2011

(65) Prior Publication Data
US 2012/0275879 A1 Nov. 1, 2012

(51) Int. Cl.
*F16B 35/04* (2006.01)

(52) U.S. Cl.
USPC ............ 411/424; 411/900; 411/901; 411/908

(58) Field of Classification Search
USPC ......... 411/403, 411, 424, 900, 901, 903, 906, 411/908, 914
See application file for complete search history.

(56) References Cited

U.S. PATENT DOCUMENTS

| | | | | |
|---|---|---|---|---|
| 2,083,092 A | * | 6/1937 | Richer | 411/403 |
| 2,229,565 A | * | 1/1941 | Hallowell, Jr. | 411/403 |
| 3,022,802 A | * | 2/1962 | Lewis | 138/125 |
| 4,623,290 A | * | 11/1986 | Kikuzawa et al. | 411/350 |
| 4,659,268 A | | 4/1987 | Del Mundo et al. | |
| 4,687,398 A | | 8/1987 | Berecz | |
| 4,717,302 A | | 1/1988 | Adams et al. | |
| 4,863,330 A | | 9/1989 | Olez et al. | |
| 5,033,925 A | * | 7/1991 | Moghe | 411/366.1 |
| 5,080,547 A | | 1/1992 | Moghe | |
| 5,098,240 A | * | 3/1992 | Gapp et al. | 411/424 |
| 5,114,290 A | * | 5/1992 | Moghe | 411/411 |
| 5,127,783 A | | 7/1992 | Moghe et al. | |
| 5,292,215 A | | 3/1994 | Roberts, III | |
| 5,564,874 A | | 10/1996 | Agatonovic | |
| 5,913,650 A | * | 6/1999 | Daoud | 411/410 |
| 2004/0151558 A1 | * | 8/2004 | Klopper | 411/403 |
| 2006/0088402 A1 | * | 4/2006 | Niku | 411/382 |
| 2008/0240883 A1 | * | 10/2008 | Walling | 411/178 |

FOREIGN PATENT DOCUMENTS

| | | |
|---|---|---|
| DE | 1557762 | 1/1978 |
| EP | 0 373 640 A2 | 6/1990 |
| EP | 0 373 641 A2 | 6/1990 |
| EP | 0 449 245 A2 | 10/1991 |
| WO | 20050058525 | 6/2005 |

* cited by examiner

*Primary Examiner* — Roberta DeLisle
(74) *Attorney, Agent, or Firm* — Reising Ethington P.C.

(57) ABSTRACT

A fastening device for securing panels together. Threads are formed along an outer circumference of a shank of the fastening device. The shank is coaxially connected to a head configured to be engaged by and to transfer torque loads from a tool to the shank. The shank comprises concentric cylindrical braid layers that each includes braided reinforcing fibers infiltrated with a resin matrix and adhesive layers may be disposed between them.

35 Claims, 6 Drawing Sheets

FASTENING DEVICE

CROSS-REFERENCES TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

This invention relates generally to a fastening device for securing panels together.

2. Description of the Related Art Including Information Disclosed Under 37 CFR 1.97 and 1.98

Ultra high temperature ceramic (UHTC) articles are known to be more brittle and weak than metallic and organic composite articles. The micro-cracked nature of the matrices and/or interfaces within UHTC articles makes it difficult to translate the properties of their reinforcing elements. Structural fasteners have complex loadings with large interlaminar stresses not compatible with monolithic ceramics, and to a slightly lesser extent, composite UHTC's.

One approach to distributing loads in a composite fastener is to form a shank of the fastener by molding threads into a covering formed over a cylindrical core matrix comprising layered axially-oriented carbon or graphite fiber reinforcement. The covering into which the threads are molded includes several layers of carbon fibers drawn onto the core matrix by a helical winding method such that the fibers extend at an angle that is acute relative to the core axis and that preferably corresponds to a pitch angle of the screw threads to be formed into the covering.

Another approach to forming a composite fastener capable of distributing loads is to form its shank by molding threads into an exterior member or casing that includes resin-matrix-embedded axially-oriented material strips wrapped longitudinally over the shank that comprises resin-matrix embedded axially-oriented fibers. A mesh-like overwrap may then be applied over the casing and the threads to introduce off-axis fibers.

BRIEF SUMMARY OF THE DISCLOSURE

A fastening device is provided for securing panels together. The device may comprise generally cylindrical shank comprising a resin matrix and threads formed along a circumference of the shank. The shank may comprise concentric braid layers that each includes braided reinforcing fibers infiltrated with the resin matrix. The shank may comprise three or more concentric braid layers that each includes braided reinforcing fibers infiltrated with the resin matrix. The device may additionally include adhesive layers disposed between the braid layers and configured to transfer loads between the braid layers.

The threads may be formed in the outer braid layer along the shank. The braided reinforcing fibers of the outer braid layer may include staple fiber tows.

The adhesive layers may include one or more components selected from the group of components consisting of adhesive, adhesive having intrinsic strength capable of transferring loads from concentric braided lamina bond resin, base resin configured to match physical properties of the braid layers, a textile carrier, felt, very short fibers of Length/Diameter <4, particular matter, or metal matrix.

One or more of the braid layers of the concentric cylindrical braid layers may include braided reinforcing fibers. A mid braid layer of the concentric cylindrical braid layers may be formed around a core braid, and the outer braid layer may be formed around the mid braid layer.

The core braid may include braided reinforcing fibers angled in a highly axial fiber orientation at a braid angle that may be less than 45 degrees relative to the fastener axis, and that may be in the approximate range of 5-30 degrees relative to the fastener axis. The mid braid layer may include braided reinforcing fibers that may have a fiber orientation less axial than that of the core braid and that may have a braid angle of approximately 45 degrees relative to the fastener axis. The outer braid layer may include braided reinforcing fibers that may have a fiber orientation less axial than that of the mid braid layer fibers, that may have a braid angle of greater than 45 degrees relative to the fastener axis, and that may have a braid angle in the approximate range of 60 to 85 degrees relative to the fastener axis. The outer braid layer may include braided reinforcing fibers having a braid angle that approaches a helix angle of the thread. At least one of the concentric braided layers may comprise reinforcing fibers different from those in at least one of the other braided layers.

The outer braid layer may include staple fiber tows in its braid, and an outer adhesive layer may be disposed on the outer braid layer. The outer adhesive layer may include one or more components selected from the group of components consisting of adhesive, adhesive having intrinsic strength capable of transferring loads from concentric braided lamina bond resin, base resin configured to match physical properties of the braid layers, a textile carrier, felt, very short fibers of Length/Diameter <4, particular matter, or metal matrix.

A head may be connected coaxially to the shank and configured to be engaged by and to transfer torque loads from a tool to the shank.

According to an alternative embodiment, the shank may comprise an inner circumferential surface defining a hollow core and an outer torque feature rather than a head with the threads being formed along the inner circumferential surface of the shank rather than an outer circumference.

Also according to the alternative embodiment, the outer braid may include braided reinforcing fibers angled in a highly axial fiber orientation at a braid angle that may be less than 45 degrees relative to the fastener axis and that may be in the approximate range of 5-30 degrees relative to the fastener axis.

Also according to the alternative embodiment, the mid braid layer may include braided reinforcing fibers that may have a fiber orientation less axial than that of the outer braid, and that may have a braid angle of approximately 45 degrees relative to the fastener axis.

Also according to the alternative embodiment, the inner braid layer may include braided reinforcing fibers that may have a fiber orientation that may be less axial than that of the mid braid layer fibers, that may have a braid angle of greater than 45 degrees relative to the fastener axis, that may have a braid angle in the approximate range of 60 to 85 degrees relative to the fastener axis, and that may have a braid angle that approaches a helix angle of the thread.

Also according to the alternative embodiment, the inner braid layer may include staple fiber tows in its braid and an inner adhesive layer may be disposed on the inner circumferential surface of the shank. The inner adhesive layer may include one or more components selected from the group of components consisting of adhesive, adhesive having intrinsic strength capable of transferring loads from concentric braided lamina bond resin, base resin configured to match physical properties of the braid layers, a textile carrier, felt, very short fibers of Length/Diameter <4, particular matter, or metal matrix.

Also provided is a method for making a fastening device. The method may include forming a preform of concentric cylindrical braid layers that each includes braided reinforcing fibers, infiltrating the preform layers with a resin matrix, and forming threads in a circumferential surface of the preform.

Preform formation may include forming a core braid at a first braid angle, which may include forming the core braid around a fugitive core then removing the fugitive core. Successive braid layers may be formed at successively higher braid angles relative to a fastener axis and at least one adhesive layer may be disposed around at least one of the braid layers. An outer adhesive layer may also be disposed around an outer braid layer.

Thread formation may include molding threads into an outer circumferential surface of the preform which may include enclosing at least a section of the preform in a thread mold and allowing the resin to cure. The threads may be molded into an outer adhesive layer and an outer braid layer of the preform and may be formed at a helix angle approaching the braid angle of the outer braid layer.

A head may be formed on the preform, which may include enclosing at least a section of the resin matrix infiltrated preform in a head mold comprising a head cavity, axially compressing the preform to cause the preform to fill the head cavity, and allowing the resin to cure. A torque feature may be formed into the head.

Forming and infiltrating the braid layers of the preform may include forming and infiltrating the braid layers of an elongated preform having a length at least equal to at least twice a desired fastening device length. The elongated preform may then be cut into sections with each section having a length generally equal to the desired fastening device length.

Forming the core braid may alternatively include forming the core braid around a fugitive nut preform core, and forming the threads in an inner circumferential surface of the preform rather than an outer circumferential surface. According to this alternative method, preform formation may include forming successive braid layers at successively lower braid angles relative to a fastener axis, disposing at least one adhesive layer around at least one of the braid layers, and disposing an inner adhesive layer around the inner circumferential surface of the preform.

Also according to this alternative method, thread formation may include molding threads into the inner circumferential surface of the preform, which may include molding threads into the inner adhesive layer and the core braid layer of the preform. The threads may be formed at a helix angle approaching the braid angle of the inner braid layer.

BRIEF DESCRIPTION OF THE SEVERAL VIEWS OF THE DRAWINGS

These and other features and advantages will become apparent to those skilled in the art in connection with the following detailed description and drawings of one or more embodiments of the invention, in which.

DETAILED DESCRIPTION OF INVENTION EMBODIMENT(S)

Figures 1, 2:
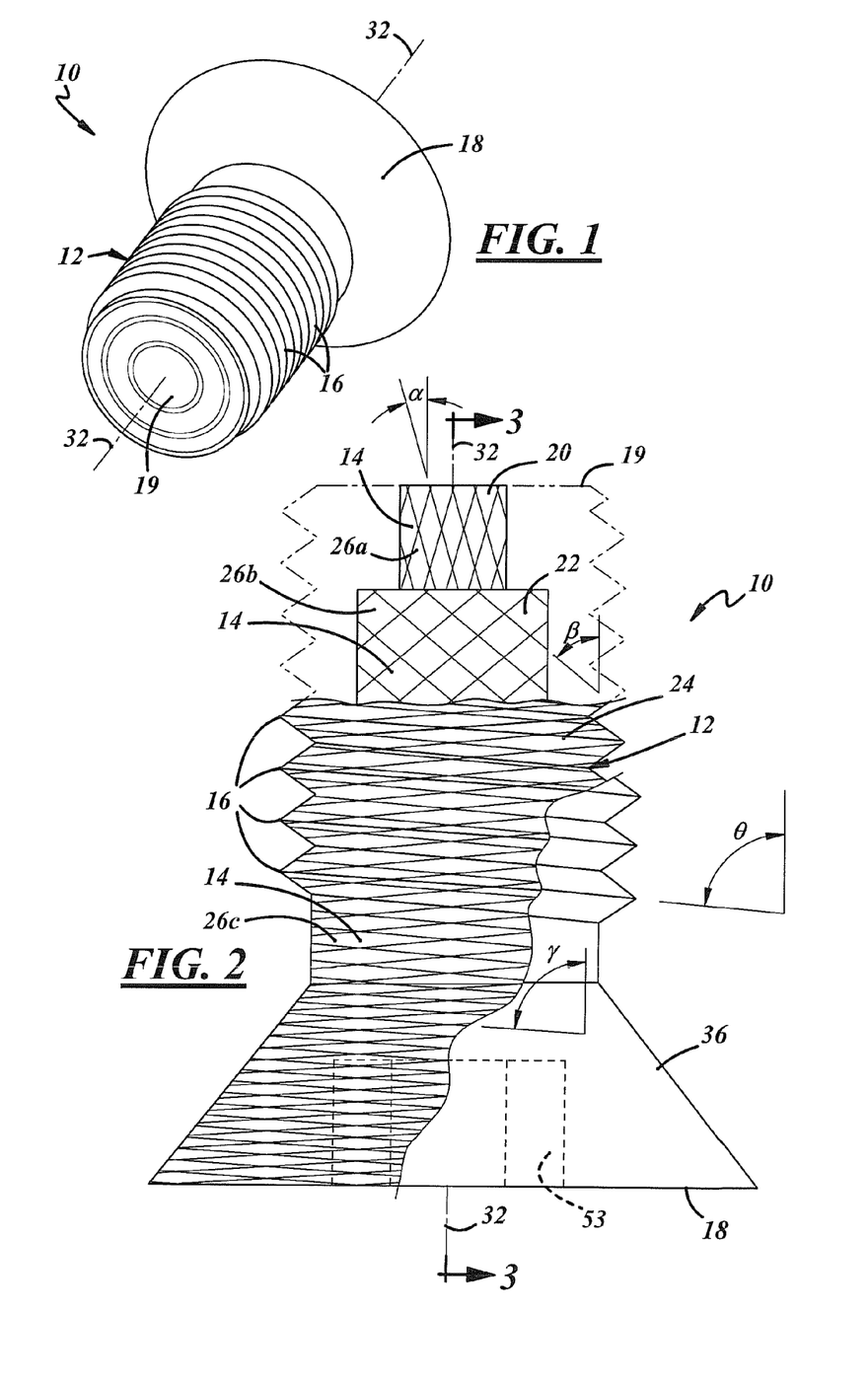
FIG. 1 is an orthogonal view of a fastening device constructed according to an embodiment of the invention.
FIG. 2 is a partially cut-away fragmentary front view of the device of FIG. 1 with successive layers of the device cut-away to reveal layers beneath.
Figure 3:
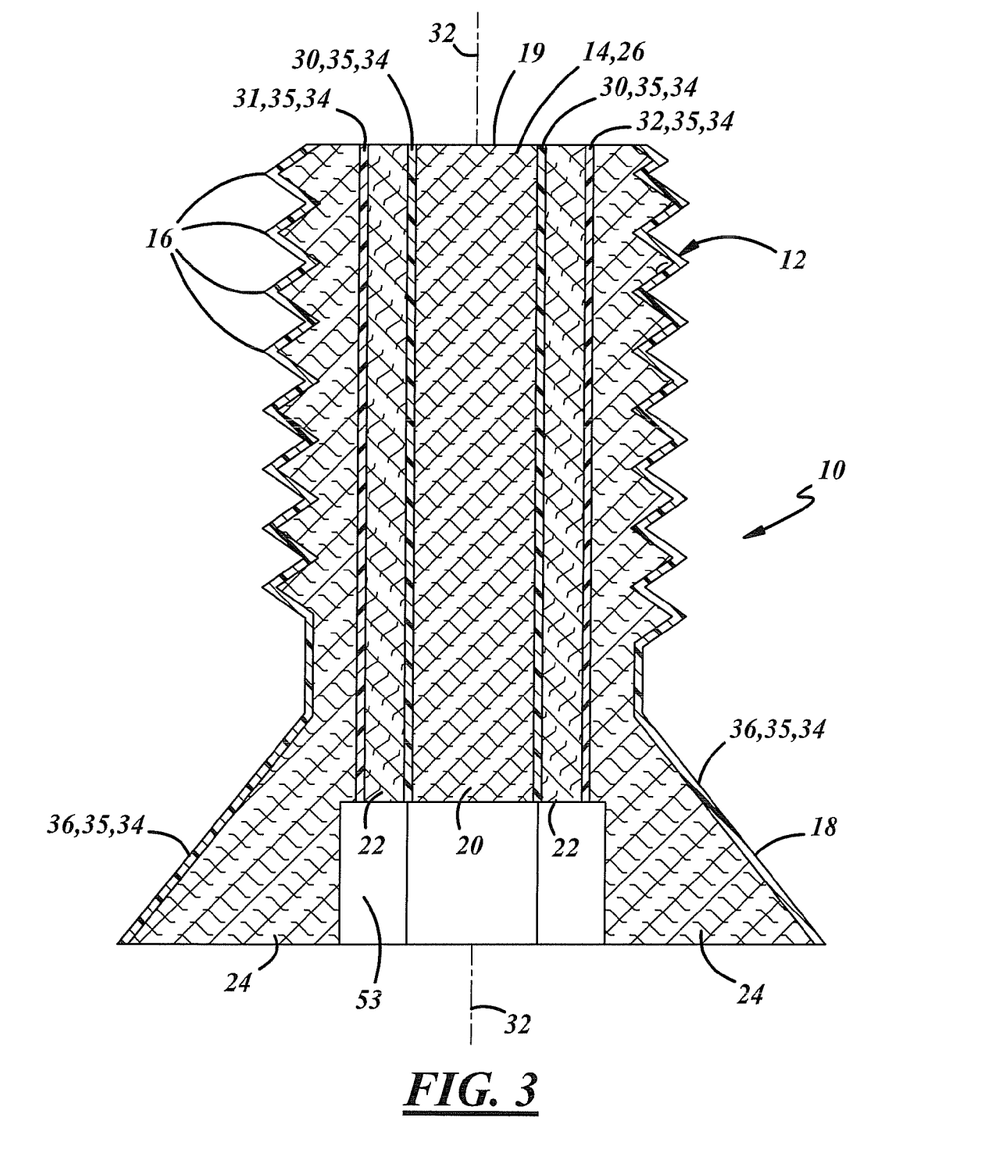
FIG. 3 is a cross-sectional front view of the device of FIG. 1 taken along line 3-3 of FIG. 2.

A fastening device for securing panels together is generally shown at 10 in FIGS. 1-3. A second embodiment is generally shown at 10" in FIGS. 7-9. Reference numerals with the designation double prime (") in FIGS. 7-9 indicate alternative configurations of elements that also appear in the first embodiment. Unless indicated otherwise, where a portion of the following description uses a reference numeral to refer to FIGS. 1-3, that portion of the description applies equally to elements designated by double-primed numerals in FIGS. 7-9.

The device 10 may include a generally cylindrical shank as is generally indicated at 12 in FIGS. 1-3, and that comprises threads 16 formed in and along an outer circumference of the shank 12. The device 10 may also include a head 18 connected coaxially to the shank 12. As best shown in FIGS. 2 and 3, the head 18 may be integrally formed with the shank 12 as a single unitary piece configured to be engaged by and to transfer torque loads from a tool to the shank 12. The shank 12 may comprise three or more concentric cylindrical braid layers 20, 22, 24 that each include braided reinforcing fibers 26 infiltrated with a resin matrix 14, coated with an adhesive 34 such as a bond resin to form adhesive layers 30, 31, 36, and configured to distribute axial loads from the threads 16 and torque loads from the head 18 throughout the fastener device 10. More specifically, the concentric braid layers 20, 22, 24 and adhesive layers 30, 31, 36 are able to transmit axial loads from the threads 16 radially inward to, and then axially along, a radially innermost core braid 20 of the braid layers 20, 22, 24. At least one inner braid layer 22 is able to transmit torque load from the head 18 radially outward to the outer braid layer 24 and the threads. In other embodiments the device 10 may be a hollow, rather than a solid core bolt as shown in the drawings, or may be a nut rather than a bolt, with radial braid angles sequences reversed for the internal thread location.

As best shown in FIG. 2 a radially outer braid layer 24 of the concentric cylindrical braid layers 20, 22, 24 may include braided reinforcing fibers 26c. The threads 16 may be formed into the outer braid layer 24 along the shank 12. The braided reinforcing fibers 26c of the outer braid layer 24 preferably include higher loft, compliant staple fiber tows. The fiber tows of the outer braid layer 24 may be configured to match thread orientation to increase geometric compliance of the fibers yielding more uniform reinforcement and properties in the thread.

Figure 4:
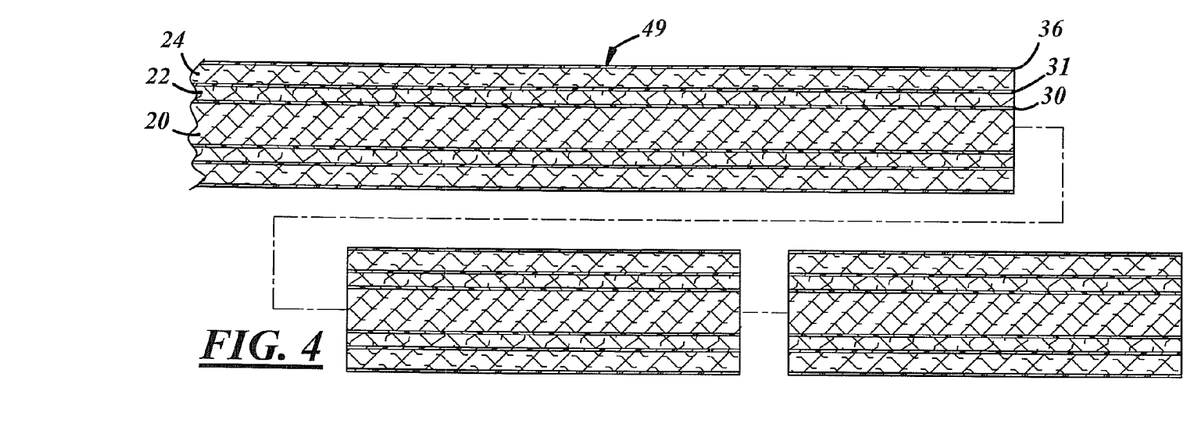
FIG. 4 is a cross-sectional front view of a preform constructed according to an embodiment of the invention and showing two sections or plugs cut from the preform infiltrated with a resin matrix and molded into the configuration of the fastener shown in FIG. 1.
Figure 5:
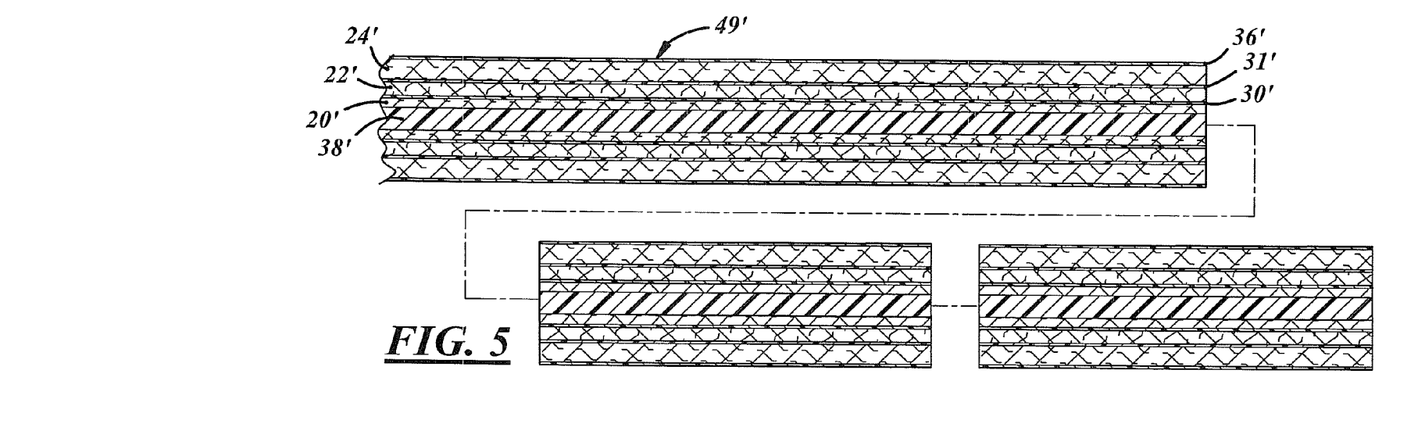
FIG. 5 is a cross-sectional front view of a preform constructed around a solid core according to an alternative embodiment of the invention and showing two sections or plugs cut from the preform infiltrated with a resin matrix and molded into a fastener.

As shown in FIGS. 2-4, a mid braid layer 22 of the concentric cylindrical braid layers 20, 22, 24 may be formed around the core braid 20. The outer braid layer 24 may be formed around the mid braid layer 22, and the core braid 20 may include braided reinforcing fibers 26a, which may be formed on themselves as best shown in FIG. 3. As shown in FIG. 5, the core braid 20 may alternatively be formed around a solid core 38, which, if device 10 is to be a nut or hollow core bolt, may be a fugitive core element.

As shown in FIGS. 3 and 4, a first thin compliant adhesive layer 30 or "bondline" may include an adhesive 34 which may comprise bond resin and may or may not be supported by a fibrous felt 35 and may be disposed between the core 20 and the mid braid layer 22 to bridge what would otherwise be an intermittent gap in the hybridized braided surfaces between the core 20 and the mid braid layer 22. The first highly filled adhesive layer 30 may also serve to improve inter-laminar shear characteristics between the core and the mid braid layers. All additional interfaces between braided layers, such as between the mid braid layer 22 and the outer braid layer 24, may have similar adhesive bondlines applied. In the present embodiment, a second adhesive layer 31, which may comprise bond resin and a thin compliant carbon felt layer 35 infiltrated with the adhesive 34, may be disposed between the mid braid layer 22 and the outer braid layer 24 to bridge what would otherwise be a gap in the hybridized structure between the mid braid layer 22 and the outer braid layer 24 and to serve as a compliant adhesive that improves inter-laminar shear characteristics between the mid and outer braid layers 22, 24.

The resin matrix 14 infiltrating the braid layers, as typical in the art, may include polymeric resins, metals or ceramic precursors without fillers or additives or be loaded with various particulates or toughening additives to increase load transfer capability and minimize physical deficiencies. The fillers may be at least one-tenth the diameter of fibers 26a, 26b, 26c in order to infiltrate the fiber tows effectively for consistent properties throughout the composite.

The bondlines 30, 31, and more if needed, disposed between braid layers 20, 22, 24 transfer high planar loads between the braid layers 20, 22, 24. A few high strength matrix systems 14 may be capable of transmitting these high loads, but many other matrices may be deficient. Heavily filled resins increase the tensile, compressive and shear strength and thus increase the load and torque transfer of the fastener across gaps between braided layers and may be used to modify the bondline adhesive 34 to match physical properties and reduce shrinkage in systems that lose mass or densify when processed to their final state. The adhesive 34 will typically require this type of modification to produce maximum fastener strength.

Fibers with short Length/Diameter (L/D) ratios yield greater mechanical properties without impairing processing characteristics. For example, the adhesive 34 alone or used as the felt infiltrant may include a phenolic resin precursor to a carbon fiber matrix (e.g., Hexion SC-1008) having a very high loading (approx. 0.40 Vf) of short length-to-diameter ratio (L/D ~4) carbon fibers (e.g., Zoltek PANEX 30) as is further disclosed in U.S. patent application Ser. No. 12/185,653 filed Aug. 4, 2008, which is assigned the assignee of the present invention and is incorporated herein by reference. This formulation has been empirically demonstrated to be sufficiently strong, to have superior stiffness and resistance to shrinkage, and to have sufficient gas and liquid permeability to make the formulation processable to high density and strength. The formulation has also been shown to readily transfer loads, and to be capable of fully filling interface layer abnormalities. Used alone or infiltrated into the thin, low density felt 35 of the interface layers 30, 31, this adhesive provides handleability and further reinforcement of the interface layers 30, 31.

As best shown in FIG. 2, a progression of braid angles α, β, γ from that of the outer braid layer 24 to that of the core braid 20 is optimized to match reinforcement orientation to the loads each braid layer is to carry and transmit, providing the braid layers 20, 22, 24 with successively lesser degrees of torsional stiffness. This stiffness gradient helps distribute torque loads applied to the head 18 and transmitted from the head 18 through the shank 12 to the threads 16 molded into the outer layers 24 along the shank section 12 of the fastener 10. The braid angle progression from outer braid layer 24 to core braid 20 also provides the braid layers 20, 22, 24 with successively greater degrees of axial stiffness, which helps distribute axial loads from the threads 16 to and along the core braid 20.

The fibers, 26a, 26b, 26c shown in FIG. 2 may be varied to achieve control of load transfer and matching of anisotropic properties. Increasing the fiber modulus of the inner braid layers 20, 22, 24 will affect load transfer and the total number of threads providing load transfer increasing the overall fastener capability for brittle or low inter-laminar strength materials. Proper selection of physical properties allows other properties, such as coefficient of thermal expansion (CTE) to be matched in anisotropic composites. For highly anisotropic carbon-carbon, core fiber 26a specified as SiC would achieved a fastener CTE much closer to the transverse CTE of the carbon-carbon greatly reducing inter-laminar stresses to the carbon-carbon with thermal cycling.

As shown in FIG. 2, the braided reinforcing fibers 26a within the core braid 20 may be angled in a highly axial fiber orientation at a core braid angle of significantly less than 45 degrees relative to the fastener axis 32. The shallow braid angle transfers clamp load efficiently along a full length of the fastener 10 from the head 18 to a distal end 19 of the shank 12 opposite the head. The core braid 20 may include braided reinforcing fibers 26a having a braid angle in the approximate range of 5-30 degrees relative to the fastener axis 32. The core braid angle selected for a fastener 10 may depend on a number of factors including the geometry of the fastener, the type of braiding equipment being used, the type and number of tows being used and the material and physical properties of the fibers used.

As shown in FIG. 2 the braided reinforcing fibers 26b within the mid braid layer 22 may have a fiber orientation less axial than that of the core braid 20. The reinforcing fibers of the mid braid layer 22 serve as a primary torque element of the fastener 10 and are configured to carry and withstand fastener installation and removal torques. The reinforcing fibers of the mid braid layer 22 may have a mid layer braid angle β of approximately 45 degrees relative to the fastener axis 32. Preferably, the braid angle β of the mid braid layer fibers is in the range of 30 to 60 degrees relative to the fastener axis 32.

As shown in FIG. 2 the outer braid layer 24 may include braided reinforcing fibers 26c having a fiber orientation less axial than that of the fibers of the mid braid layer 22 to enable the fastener 10 to more closely match the coefficient of thermal expansion and the stiffness of a laminate or laminates with which the fastener 10 is to be engaged. Braided reinforcing fibers 26c in the outer braid layer 24 may have an outer layer braid angle γ of significantly greater than 45 degrees relative to the fastener axis 32. The braid angle γ of the outer braid layer 24 may be in the approximate range of 60 to 85 degrees relative to the fastener axis 32. As with the core braid angle α of the core braid 20, the braid angle γ selected for the outer braid layer 24 of a fastener 10 depends on a number of factors including the geometry of the fastener 10, the type of braiding equipment being used, the type and number of tows being used and the material and physical properties of the fibers used. Preferably, the braid angle γ of the outer braid layer fibers is in the range of 75 to 85 degrees relative to the fastener axis 32.

As shown in FIG. 2, the braid angle γ of the braided reinforcing fibers 26c of the outer braid layer 24 may approach within 15 degrees the helix angle θ of the thread 16. This makes the thread 16 easier to form and well aligned to torque shear once formed. The load spreading of the highly axial core 20 reduces the axial stress on the high braid angle outer braid layer 24.

The outer braid layer 24 may include staple fiber tows in its braid to increase geometric compliance of the reinforcing fibers sufficiently for threads 16 to be formed into the outer braid layer 24 with more uniform distribution. Loading and size of fillers in the adhesive 34 infiltrating the high loft staple outer braid layer 24 may be increased in high axial load applications to increase the structural integrity of the threads 16.

As best shown in FIGS. 2 and 3, a thin outer coating adhesive layer 36 may be used and may comprise a heavily filled bond resin adhesive 34 and may or may not contain carbon felt 35, and may be disposed on the outer braid layer 24. The outer braid layer 24 and the outer adhesive coating layer 36 have sufficient compliance to allow threads 16 to be fully formed in the shank 12 and to retain their shape once molded.

Any use-suitable engineering fiber may be used to form the braid layers 20, 22, 24. Also, different braid layers in the fastener 10 may have different fibers. Examples of suitable engineering fibers include fibers formed from materials such as nylon, polyester, Kevlar® (aramid), Spectra (polyethylene), alumina, $SiO_2$ (e.g., quartz), $Al_2O_3$—$SiO_2$—$(B_2O_3)$ (Nextel™ (s)), SiC, zirconia, carbon/graphite, fiberglass and engineering metals. Other substances from which fibers may be made include $Al_2O_3$—$SiO_2$ (mullite), AlN, SiN, SiNC, SiOC, spinel, zircon, ZrO2, ZrC, $ZrB_2$, $HfO_2$, HfC, HfB2, $TiO_2$, TiC, $Ta_2O_5$, TaC, and rare earth oxides (e.g., $Y_2O_3$). High temperature fiber precursors for fiber fabrication include polyimides, PBI, PBT, pre-ceramic polymers (polycarbosilanes, polysilynes, polysilazane, polyureasilazane); oxidized polyacrylonitrile (PAN) and pitch and others that would pyrolyze in-place. Also, a known sintering process via optimized binders with polymeric processing of nano-sized ceramic powders enables almost any engineering ceramic capable of fabrication into a fiber for this application, and is available from United Materials International, LLC.

Most fibers in brittle matrices include some form of interface modification to achieve the preferred crack blunting effect of a weak interface. Heat treated carbon fibers, which develop graphitic character, have a fiber surface appropriate for forming a weak fiber-matrix interfacial bond that produces a toughened composite, less susceptible to brittle failure and may not be coated. Interface coatings are typically used for this purpose, two examples of these being known in the art as pyrolytic carbon and boron nitride. Interface layers may include materials and thicknesses that are composition and use-environment dependent.

Matrix materials for infiltrating both the braid layers 20, 22, 24, the interface layers 30, 31, and the outer coating layer 36 may include organic polymers, pre-ceramic polymers, ceramic and metal compositions, all may further contain polymeric, particulate or fibrous fillers of great variety to increase strength, toughness and improve matrix qualities. Polymeric base resins include processable thermoplastics including low viscosity variants of amorphous, semi-crystalline and crystalline polymers and thermosets including epoxy, bis-maleimide, cyanide ester, silicone, phenolic and others. Pre-ceramic polymers may include polycarbosilanes, polysilynes, polysilazane, polyureasilazane, phenolic, bis-maleimide, polyacrylonitrile (PAN) and petroleum or coke pitches and others. Ceramic solutions may include slip-casting and adhesive formulations of ceramics listed above and their combinations with appropriate binders and ceramic sol-gels. Metal matrices are known in the art and would cover cryogenic to extreme temperature as well as a wide range of corrosive environments and be melt infiltrated or impregnated as powder metal compositions with appropriate binders and lubricants. The high temperature material pre-cursors would pyrolyze and/or sinter in-situ producing an appropriate matrix. These materials may benefit from secondary densification and thermal treatment steps.

Fillers comprise an expansive range of materials that may also be chosen for their capability to modify matrix properties in-process or in end-use environments. For the purpose of this invention without specific performance requirements; the fillers may possess differing sizes and shapes in order to be infiltrated into the fiber tows and felts without affecting the adjacent constituents. An example would be the resin matrix 14 requires sub-micron fillers in order to modify the resin within the tow; while the felt can employ micron-sized fillers effectively, thus, along with process sequence, modifying the formulation of both reinforcements independently.

Example 1

Carbon-carbon fastener: Nominally 5/16"—18 UNC: Eight CYTEC T300, 12 k carbon fiber tows are threaded into a 12+ bobbin Maypole braiding machine set to low angle braiding of 10 degrees for a nominal diameter 0.120" central core. The product cable is impregnated via a dip bath with serpentine squeeze rolls to work the resin matrix into the cable and remove excess resin. A helical wrap of Technical Fiber Products 20301A 10 g/m2 carbon paper cut to ~3/8" width is applied down the length of the cable. A bond resin mixture of 100 parts by weight of Momentive Specialty Chemicals SC-1008 phenolic resin and 100 parts by weight of Zoltek PANEX fiber reduced to an L/D of <4 is applied at 200 g/m2 areal weight to the wrapped cable. The braider is reset to 30 degrees braiding angle and the braiding; impregnation, paper wrap and impregnation with bond resin is repeated. Another braided layer is applied at 55 degrees braiding angle, resin impregnated, wrapped and bond resin filled. These layers yield approximately a 0.120" 10 degree core, a less axially aligned 30 degree torque layer, and a still lower axially aligned 55 degree torque layer. The T300 fiber is replaced with 12 PX30YS 1005 Zoltek spun carbon fiber tows with higher loft which is braided at an angle of 75 degrees. This layer is impregnated only with the bond resin to excess. The preform is placed in a release coated, match-die mold of a 5/16"—18 fastener under tension and the mold closed slowly to allow excess resin to flow out of the mold. The cable is cut flush at the distal end and with ~0.75" excess length on the head forming side. A head forming ram is axially engaged forming the head with hexagonal torque surfaces. The mold is secured and the fastener cured. The cured fastener is pyrolyzed slowly in an inert atmosphere to >800 C and held for 1 hour. The fastener is treated to cyclic densification cycles of SC-1008 impregnations, cure, and pyrolysis until the weight gain is minimal. The fastener is heat treated to >1500 C in an inert atmosphere to create internal porosity by further weight loss and matrix densification and put through more densification cycles until further benefit is negligible. If required, threaded dies are used during densification and at final condition to retain proper thread form and head dimensions. This product is a hex head, 5/16"-18 threaded fastener with roughly the properties of quasi-isotropic carbon-carbon with continuous fiber reinforcement for axial and torque loads lacking the through thickness weak axis of quasi-isotropic planar machined fastener.

Example 2

Quasi-isotropic carbon-carbon is only planar isotropic: Here, the through thickness properties are very different. The CTE is approximately 4 ppm/F higher causing failure stresses in thick parts. Modifying the composition of the fastener of Example 1 produces matched properties for the fastener and substrate. The central core carbon fibers are replaced with 8 plied tows each consisting of 6 tows of 2000 denier 3M Nextel® 440 alumina fiber with BN interface coating producing approximately the same axial core area at 10 degrees braid angle. The rest of the Ex. 1 processing is duplicated with the exception of a maximum heat treat temperature of 2500 F. The higher CTE of axial alumina fiber (~3 pm/F) and its high axial directionality along with the high transverse CTE of the high angle carbon braids will produce a near match to the through thickness CTE of the carbon-carbon, reducing thermal stresses to a small fraction of the un-modified material. Further substitution of Nextel® 440 into the 30 braid may increase the CTE to a level greater than the carbon-carbon through thickness value. Thus, the composite tailorability of this invention's design is capable of producing strong fasteners that do not create thermal stresses in extreme environments.

Figure 6:
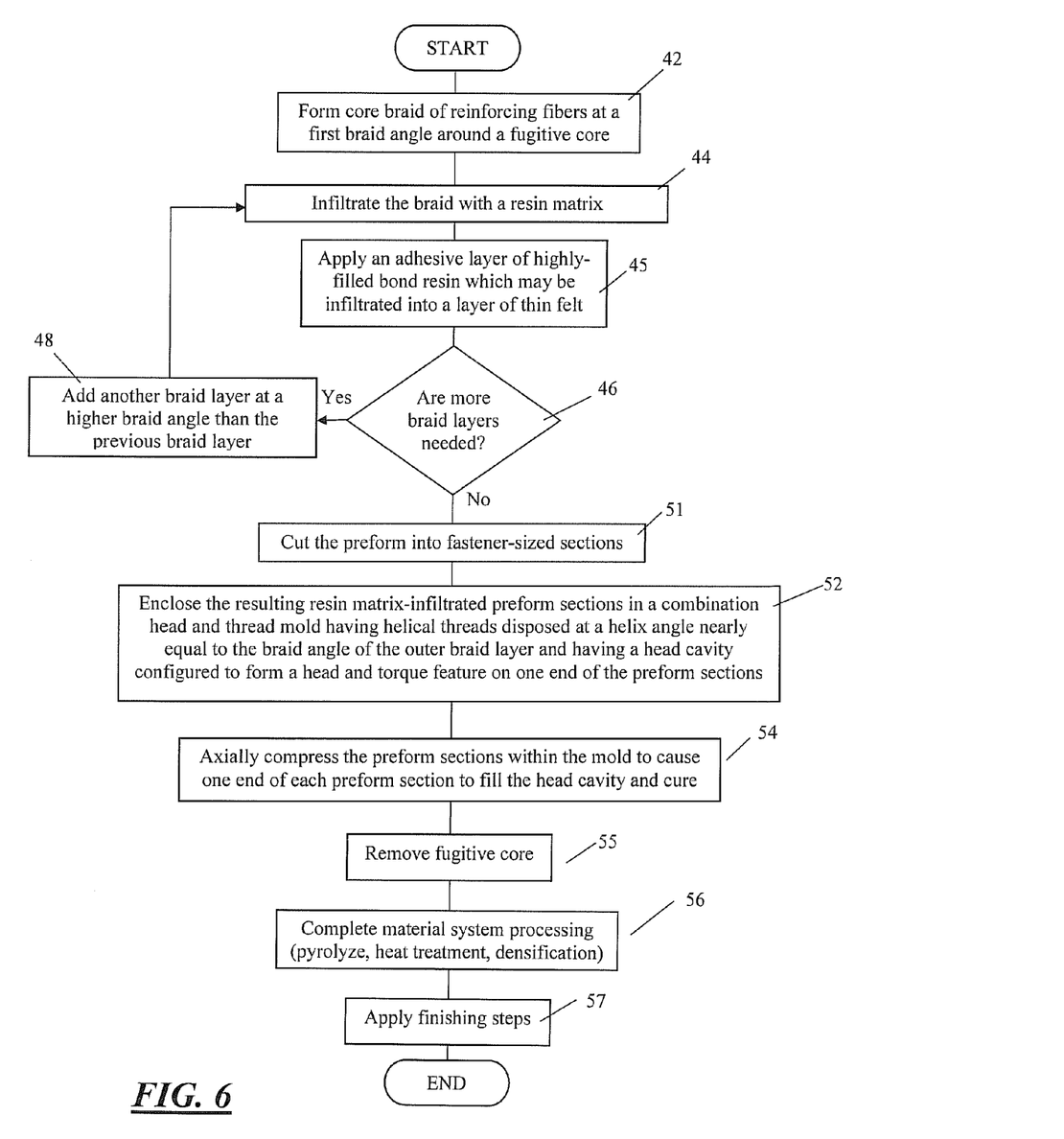
FIG. 6 is a flow chart showing a method of making a fastening device according to an embodiment of the invention.

As shown in FIG. 6, the fastening device 10 can be made by first forming the core braid 20 at a low braid angle α as shown in action step 42. The core braid 20 may or may not be formed around a solid core 38. The core 38 may or may not be a fugitive core (i.e., comprising any substance that can be washed, dissolved, or burned away). As shown in action step 44 the core braid is then infiltrated with a pre-ceramic resin matrix 14.

As shown in action step 45, the first adhesive layer 30 may be added around the core braid layer 20, and, as shown in action steps 45, 46, and 48, the successive braid layers 22, 24 may then be formed at successively higher braid angles β, γ, infiltrated with resin matrix 14, and adhesive layers 31, 36 applied around the braid layers 22, 24, creating a preform 49 of braid layers 20, 22, 24 and adhesive layers 30, 31, 36 as shown in FIG. 4.

If an elongated preform 49 is fabricated, the preform 49 may then be cut into fastener-sized sections as shown in action step 51. The preform 49 or a cut section of the preform 49 may then be enclosed in a mold as shown in action step 52. The mold may be a female thread mold having helical threads that may be disposed at a helix angle within approximately 10 degrees to the braid angle γ of the outer braid layer 24 so that the threads may be well formed with a helix angle θ as shown in FIG. 2. The mold may be a combination thread and head mold that also includes a head cavity and ram configured to form a head on one end of the preform 49. The ram may also be configured to form a torque feature 53 on and/or into the head of the fastener 10, preferentially engaging the high shear strength layers of the braided shank or forms perimeter torque features.

As indicated in action step 54, the preform 49 may be axially compressed within the mold, causing one end of the preform 49 to fill the head cavity of the mold and the preform is cured.

Where, as shown in FIG. 5, a preform 49' has been formed with a core braid 20' formed around a fugitive core 38', the fugitive core 38' may be removed as shown in action step 55 at the appropriate time along the fastener's processing path.

As indicated in action step 56, processing of the material system may include curing, pyrolysis, densification cycles, and/or heat treatment. The fastener may be removed from the mold after curing is complete. Finishing steps may include specialized treatments such as infiltration with secondary materials or coating with friction modifiers, corrosion protection, final surface smoothing and/or incorporation of thread-locking mechanisms or other such steps that may be accomplished in action step 57 after the fastener 10 is complete.

Figure 7:
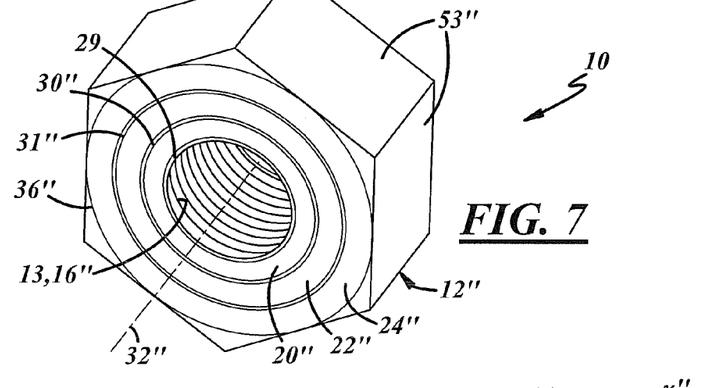
FIG. 7 is an orthogonal view of another fastening device constructed according to an embodiment of the invention.
Figure 8:
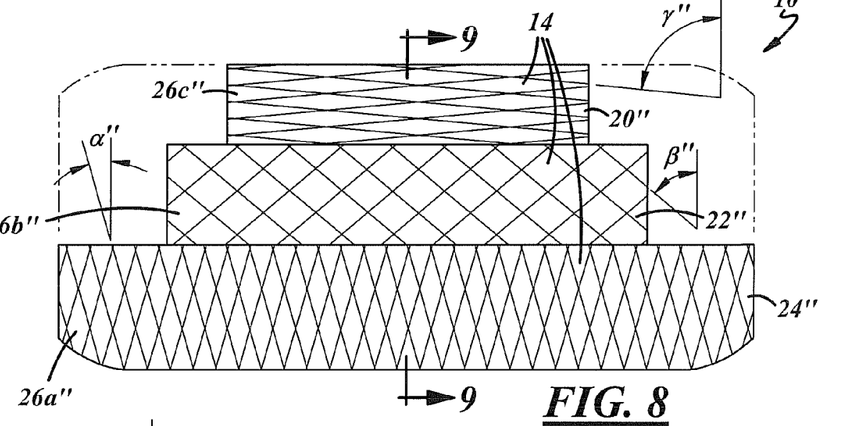
FIG. 8 is partially cut-away fragmentary front view of the device of FIG. 7 with successive layers of the device cut-away to reveal layers beneath.
Figure 9:
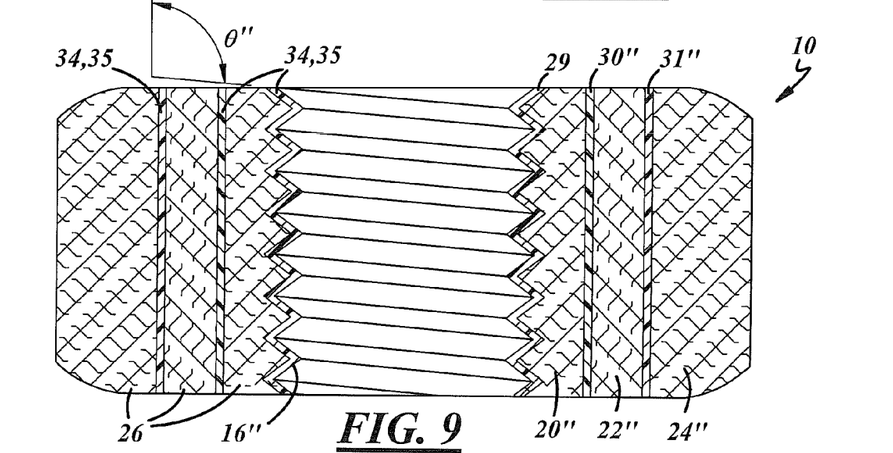
FIG. 9 is a cross-sectional front view of the device of FIG. 7 taken along line 9-9 of FIG. 7.

According to the second embodiment of the device generally shown at 10" in FIGS. 7-9, the shank 12" may comprise an inner circumferential surface 13. Threads 16" may be formed along the inner circumferential surface 13 of the shank 12". The shank 12" may also comprise outer torque features 53" such as outer circumferential facets, forming a "nut" configuration engageable by a wrench.

The shank 12" may comprise three or more concentric cylindrical braid layers 20", 22", 24" that may each include braided reinforcing fibers 26 which may be infiltrated with a resin matrix 14 and may further be coated with an adhesive 34 such as a highly-filled bond resin to form adhesive layers 29, 30", 31", 36", and configured to distribute axial loads from the threads 16" and torque loads from the torque feature 53" throughout the fastener device 10". More specifically, the concentric braid layers 20", 22", 24" and adhesive layers 29, 30", 31", 36" are able to transmit axial loads from the threads 16" radially outward to, and then axially along, a radially outermost braid layer 24" of the braid layers 20", 22", 24". The outer braid layer 24" is able to transmit torque load from the torque feature 53" radially inward to the inner braid layer 20" and the threads 16".

The outer braid 24" may include braided reinforcing fibers 26a angled in a highly axial fiber orientation at a braid angle α" that may be less than 45 degrees relative to the fastener axis and that may be in the approximate range of 5-30 degrees relative to the fastener axis 32". The mid braid layer 22" may include braided reinforcing fibers 26b that may have a fiber orientation less axial than that of the outer braid 24" and that may have a braid angle β" of approximately 45 degrees relative to the fastener axis 32". The inner braid layer 20" may include braided reinforcing fibers 26c that may have a fiber orientation that is less axial than that of the mid braid layer 22" and that may have a braid angle γ" that may be greater than 45 degrees relative to the fastener axis, may be in the approximate range of 60 to 85 degrees relative to the fastener axis, and that may approach a helix angle θ" of the thread 16". The inner braid layer 20" may include staple fiber tows in its braid. An inner adhesive layer 29 may be disposed on the inner circumferential surface 13 of the shank 12".

Figure 10:
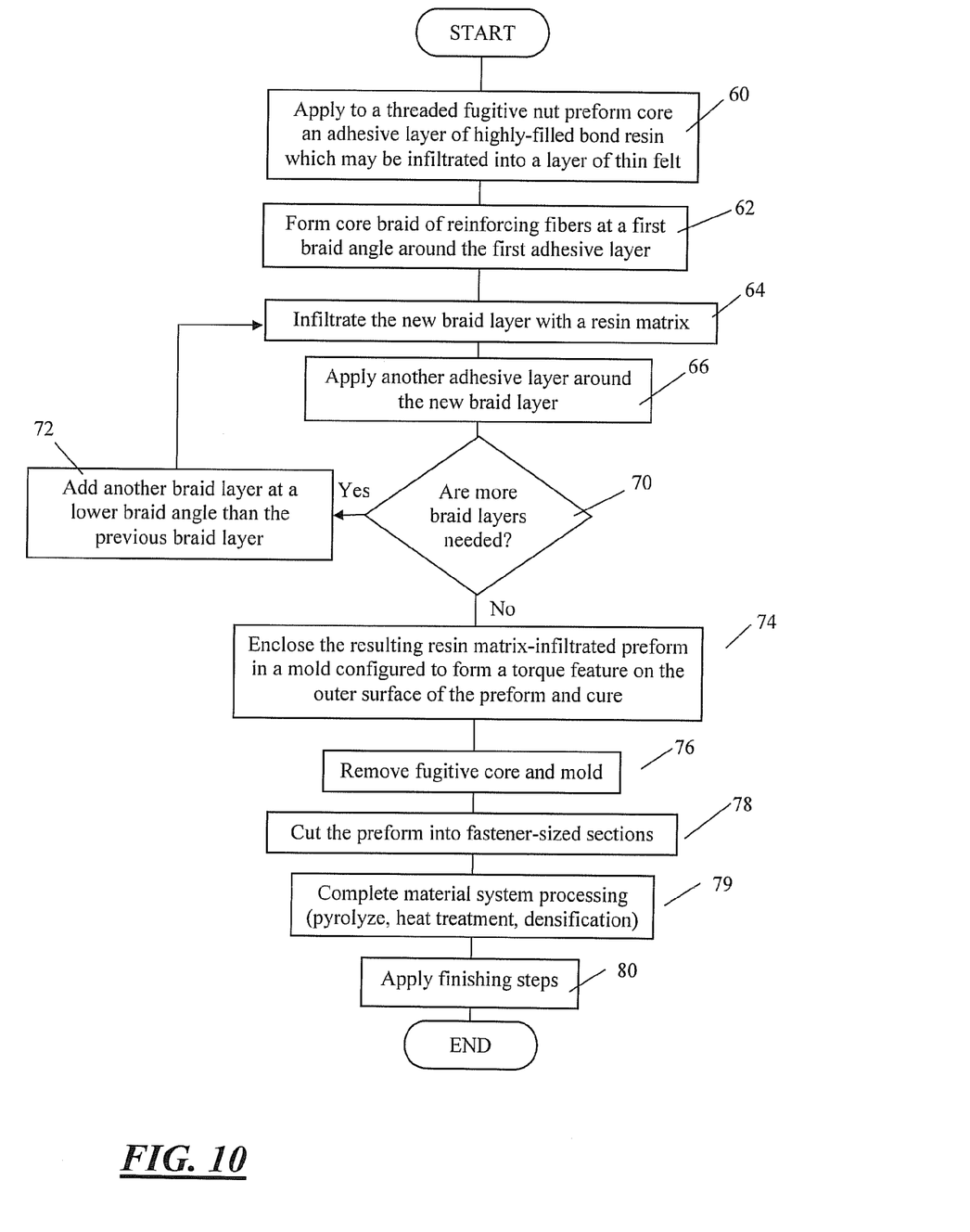
FIG. 10 is a flow chart showing a method of making a fastening device according to an embodiment of the invention.

The device 10" may be made in a nut configuration as shown in FIGS. 7-9 by first forming an inner adhesive layer 29 around a fugitive nut preform core 38" as shown in action step 60 of FIG. 10. The inner adhesive layer 29 may include one or more components selected from the group of components consisting of adhesive, adhesive having intrinsic strength capable of transferring loads from concentric braided lamina bond resin, base resin configured to match physical properties of the braid layers, a textile carrier, felt, very short fibers of Length/Diameter <4, particular matter, or metal matrix.

A core braid layer 20" of reinforcing fibers is then formed around the outer circumferential surface of the adhesive layer 29 as shown in action step 62. The core braid may be infiltrated with a pre-ceramic resin matrix 14 as shown in action step 64.

The fugitive nut preform core 38" may serve to impress threads 16" into the inner adhesive layer 29 and the core braid layer 20" at a helix angle θ" that may approach a braid angle γ" of the inner braid layer 20".

As shown in action step 66 of FIG. 10, an adhesive layer 30" may be added around the inner braid layer 20", and as shown in action steps 64, 66, 70, and 72, successive braid layers 22", 24" may then be formed around the inner layer 20' at successively lower braid angles, infiltrated with resin matrix 14, and adhesive layers 31", 36" applied around the braid layers 22", 24" creating a preform 49" of braid layers 20", 22", 24" and adhesive layers 29, 30", 31", 36". The adhesive layers 30", 31", 36" may include a highly-filled bond adhesive 34" and/or respective layers of felt 35".

The preform 49" or a section of the preform may then be enclosed in a mold and cured as shown in action step 74. The mold may be configured to form perimeter torque features 53" on and/or into the outer layers of the fastener 10".

As indicated in action step 76, once curing is complete, the mold and fugitive core 38" may be removed from the fastener 10". If an elongated preform 49" was formed, the cured preform 49" may then be cut into fastener-sized sections as shown in action step 78.

As indicated in action step 79, processing of the material system may include pyrolysis, densification cycles, and/or heat treatment. Finishing steps may include specialized treatments such as infiltration with secondary materials or coating with friction modifiers, corrosion protection, final surface smoothing and/or incorporation of thread-locking mechanisms or other such steps that may be accomplished as shown in action step 80.

A composite fastening device constructed as described above is able to handle torque, clamp, and structural loads and subsequent stresses and can have more effective thread windings than would otherwise be possible. The higher stiffness of the axial inner core of a fastening device constructed according to the first embodiment distributes stresses among the threads formed along the length of the outer circumferential surface of its shank, while the outer core of a fastening device constructed according to the second embodiment provides a similar stress spreading effect among the threads formed along the inner circumferential surface of its shank. In devices constructed according to both the first and second embodiments this allows axial loads to be transferred farther and distributed along a greater axial fastener length. Proper design with respect to all the components in the fastener can maximize the clamping force for a particular structure and material set.

This description, rather than describing limitations of an invention, only illustrates an embodiment of the invention recited in the claims. The language of this description is therefore exclusively descriptive and is non-limiting. Obviously, it's possible to modify this invention from the version shown in the description. Within the scope of the claims, one may practice the invention other than as described above.

What is claimed is:

1. A fastening device for securing panels together, the device comprising:

a generally cylindrical shank comprising a resin matrix;
   threads formed along a circumference of the shank;
   the shank comprising concentric braid layers that each includes braided reinforcing fibers infiltrated with the resin matrix; and
   adhesive layers disposed between the braid layers and configured to transfer loads between the braid layers.

2. A fastening device as defined in claim 1 in which the shank comprises three or more concentric braid layers that each include braided reinforcing fibers infiltrated with the resin matrix.

3. A fastening device as defined in claim 2 in which:
   the shank comprises an inner circumferential surface defining a hollow core;
   the shank comprises an outer torque feature; and
   the threads are formed along the inner circumferential surface of the shank.

4. A fastening device as defined in claim 3 in which the outer braid includes braided reinforcing fibers angled in a highly axial fiber orientation at a braid angle of less than 45 degrees relative to the fastener axis.

5. A fastening device as defined in claim 4 in which the outer braid includes braided reinforcing fibers having a braid angle in the approximate range of 5-30 degrees relative to the fastener axis.

6. A fastening device as defined in claim 4 in which the inner braid layer includes staple fiber tows in its braid.

7. A fastening device as defined in claim 4 in which an inner adhesive layer is disposed on the inner circumferential surface of the shank.

8. A fastening device as defined in claim 7 in which the inner adhesive layer includes one or more components selected from the group of components consisting of adhesive, adhesive having intrinsic strength capable of transferring loads from concentric braided lamina bond resin, base resin configured to match physical properties of the braid layers, a textile carrier, felt, very short fibers of Length/Diameter <4, particular matter, or metal matrix.

9. A fastening device as defined in claim 3 in which the mid braid layer includes braided reinforcing fibers having a fiber orientation less axial than that of the outer braid.

10. A fastening device as defined in claim 9 in which the mid braid layer includes braided reinforcing fibers having a braid angle of approximately 45 degrees relative to the fastener axis.

11. A fastening device as defined in claim 9 in which the inner braid layer includes braided reinforcing fibers having a fiber orientation less axial than that of the mid braid layer fibers.

12. A fastening device as defined in claim 11 in which the inner braid layer includes braided reinforcing fibers having a braid angle of greater than 45 degrees relative to the fastener axis.

13. A fastening device as defined in claim 12 in which the inner braid layer includes braided reinforcing fibers having a braid angle in the approximate range of 60 to 85 degrees relative to the fastener axis.

14. A fastening device as defined in claim 13 in which the inner braid layer includes braided reinforcing fibers having a braid angle that approaches a helix angle of the thread.

15. A fastening device as defined in claim 1 in which:
   a radially outer braid layer of the concentric cylindrical braid layers includes braided reinforcing fibers; and
   the threads are formed in the outer braid layer along the shank.

16. A fastening device as defined in claim 15 in which the braided reinforcing fibers of the outer braid layer preferably include staple fiber tows.

17. A fastening device as defined in claim 15 in which:
a mid braid layer of the concentric cylindrical braid layers is formed around a core braid; and
the outer braid layer is formed around the mid braid layer.

18. A fastening device as defined in claim 17 in which the core braid includes braided reinforcing fibers.

19. A fastening device as defined in claim 17 in which a first adhesive layer is disposed between the core braid and the mid braid layer.

20. A fastening device as defined in claim 19 in which the first adhesive layer includes one or more components selected from the group of components consisting of adhesive, adhesive having intrinsic strength capable of transferring loads from concentric braided lamina bond resin, base resin configured to match physical properties of the braid layers, a textile carrier, felt, very short fibers of Length/Diameter <4, particulate matter, or metal matrix.

21. A fastening device as defined in claim 19 in which a second adhesive layer is disposed between the mid braid layer and the outer braid layer.

22. A fastening device as defined in claim 21 in which the second adhesive layer includes one or more components selected from the group of components consisting of adhesive, adhesive having intrinsic strength capable of transferring loads from concentric braided lamina bond resin, base resin configured to match physical properties of the braid layers, a textile carrier, felt, very short fibers of Length/Diameter <4, particulate matter, or metal matrix.

23. A fastening device as defined in claim 1 further including a head connected coaxially to the shank and configured to be engaged by and to transfer torque loads from a tool to the shank.

24. A fastening device for securing panels together, the device including a generally cylindrical shank comprising:
a core braid;
concentric braid layers that each includes braided reinforcing fibers infiltrated with a resin matrix;
a mid braid layer of the concentric cylindrical braid layers, which is formed around the core braid;
a radially outer braid layer of the concentric cylindrical braid layers, which is formed around the mid braid layer and includes braided reinforcing fibers;
threads formed along a circumference of the shank in the outer braid layer along the shank; and
the core braid includes braided reinforcing fibers angled in a highly axial fiber orientation at a braid angle of less than 45 degrees relative to the fastener axis.

25. A fastening device as defined in claim 24 in which the core braid includes braided reinforcing fibers having a braid angle in the approximate range of 5-30 degrees relative to the fastener axis.

26. A fastening device as defined in claim 24 in which the mid braid layer includes braided reinforcing fibers having a fiber orientation less axial than that of the core braid.

27. A fastening device as defined in claim 26 in which the mid braid layer includes braided reinforcing fibers having a braid angle of approximately 45 degrees relative to the fastener axis.

28. A fastening device as defined in claim 26 in which the outer braid layer includes braided reinforcing fibers having a fiber orientation less axial than that of the mid braid layer fibers.

29. A fastening device as defined in claim 28 in which the outer braid layer includes braided reinforcing fibers having a braid angle of greater than 45 degrees relative to the fastener axis.

30. A fastening device as defined in claim 29 in which the outer braid layer includes braided reinforcing fibers having a braid angle in the approximate range of 60 to 85 degrees relative to the fastener axis.

31. A fastening device as defined in claim 24 in which the outer braid layer includes braided reinforcing fibers having a braid angle that approaches a helix angle of the thread.

32. A fastening device as defined in claim 24 in which the outer braid layer includes staple fiber tows in its braid.

33. A fastening device as defined in claim 24 in which an outer adhesive layer is disposed on the outer braid layer.

34. A fastening device as defined in claim 33 in which the outer adhesive layer includes one or more components selected from the group of components consisting of adhesive, adhesive having intrinsic strength capable of transferring loads from concentric braided lamina bond resin, base resin configured to match physical properties of the braid layers, a textile carrier, felt, very short fibers of Length/Diameter <4, particulate matter, or metal matrix.

35. A fastening device as defined in claim 24 in which at least one of the concentric braided layers comprises reinforcing fibers different from those in at least one of the other braided layers.

* * * * *

UNITED STATES PATENT AND TRADEMARK OFFICE
CERTIFICATE OF CORRECTION

Page 1 of 1

PATENT NO. : 8,613,580 B2
APPLICATION NO. : 13/096504
DATED : December 24, 2013
INVENTOR(S) : Daniel H. Hecht It is certified that error appears in the above-identified patent and that said Letters Patent is hereby corrected as shown below:

In the Specification

Column 7, line 46, delete "ZrO2" and insert --$ZrO_2$--

Column 7, line 46, delete "HfB2" and insert --$HfB_2$--

Column 8, line 46, delete "g/m2" and insert --$g/m^2$--

Column 8, line 50, delete "g/m2" and insert --$g/m^2$--

Column 8, line 51, delete "areal" and insert --a real--

Column 9, line 2, between "800" and "C", delete space and insert --°--

Column 9, line 5, between "1500" and "C", delete space and insert --°--

Signed and Sealed this
Fifth Day of May, 2015

Michelle K. Lee
*Director of the United States Patent and Trademark Office*